United States Patent [19]

Clarke

[11] Patent Number: 4,744,529
[45] Date of Patent: May 17, 1988

[54] SYSTEM AND METHOD FOR RECOVERY OF DISABLED AIRCRAFT

[76] Inventor: John G. Clarke, P.O. Box 4760, San Ysidro, Calif. 92073

[21] Appl. No.: 917,843

[22] Filed: Oct. 14, 1986

[51] Int. Cl.⁴ .............................................. B64F 1/00
[52] U.S. Cl. ................................ 244/114 R; 114/261; 244/110 E
[58] Field of Search ...................... 244/114 R, 110 E; 114/261

[56] References Cited

U.S. PATENT DOCUMENTS

| | | | |
|---|---|---|---|
| 1,128,072 | 2/1915 | Steinmetz | 114/261 |
| 1,856,332 | 5/1932 | Hein | 114/261 |
| 1,874,423 | 8/1932 | Belleville | 244/110 E |
| 2,342,773 | 2/1944 | Wellman | 114/261 |
| 2,692,101 | 10/1954 | Doolittle et al. | 244/114 R |
| 2,841,107 | 7/1958 | Scheider | 114/261 |
| 3,066,896 | 12/1962 | Schirtzinger | 244/110 E |

FOREIGN PATENT DOCUMENTS 553010  5/1943  United Kingdom ................ 114/261

*Primary Examiner*—Galen Barefoot
*Attorney, Agent, or Firm*—Baker, Maxham & Jester

[57] ABSTRACT

A system for the recovery of aircraft comprises a large net having sufficient length and width to accommodate an aircraft in its landing mode in water having floats around its periphery for supporting it in a body of water for receiving and supporting an aircraft for its recovery.

19 Claims, 3 Drawing Sheets

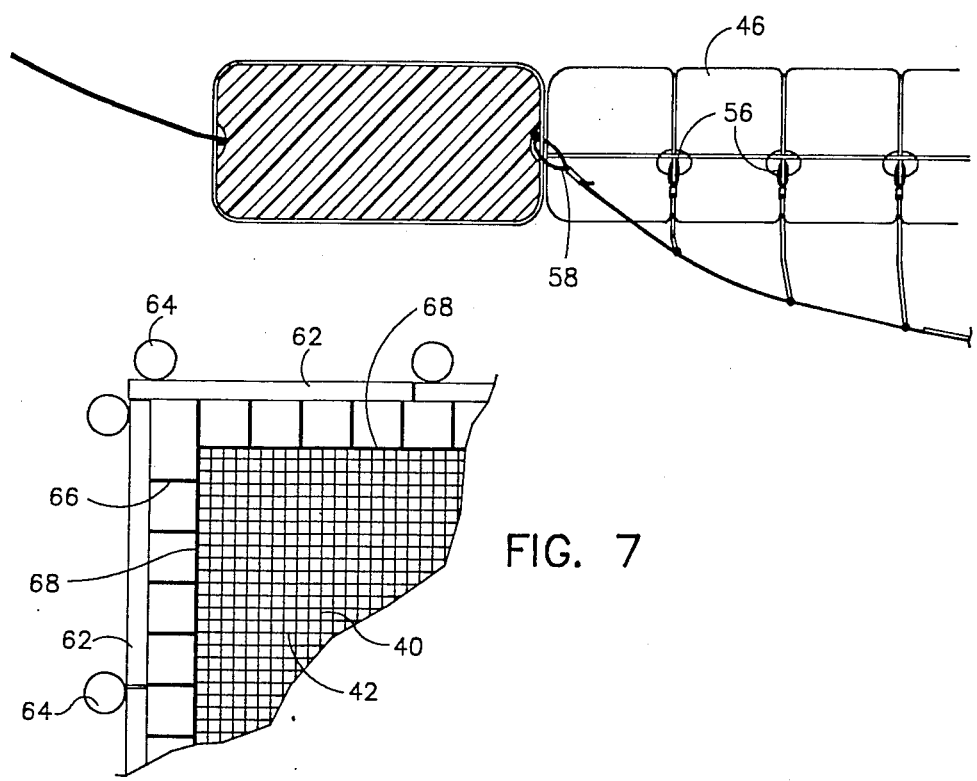
FIG. 6
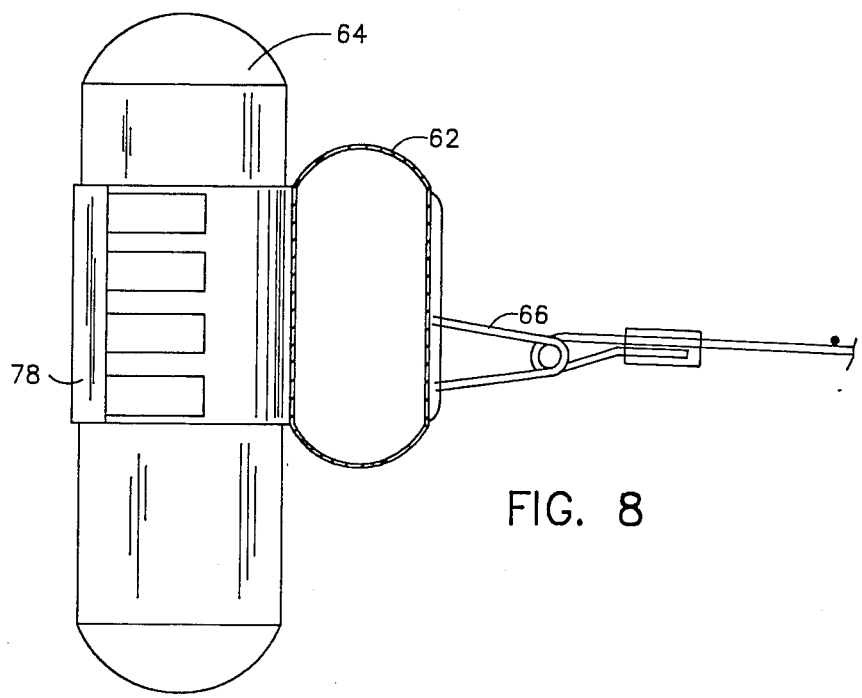
FIG. 7
FIG. 8

SYSTEM AND METHOD FOR RECOVERY OF DISABLED AIRCRAFT

BACKGROUND OF THE INVENTION

The present invention relates to emergency systems and pertains particularly to methods and systems for the recovery of disabled aircraft and the like.

Many aircraft, both civilian and military are lost each year because of the inability to safely land due to a disability or the like. Most civilian aircraft are lost due to crashes on land. Many military aircraft are lost at sea during takeoff or landing from a carrier. These crashes are costly in both lives and in equipment. An F-16 fighter plane, for example, costs on the order of about thirty-five million dollars. Civilian airliners cost a similar figure.

The military aircraft that are lost at sea typically fall to the ocean floor and are sometimes later recovered by divers and the like at great expense.

SUMMARY AND OBJECTS OF THE INVENTION

It is the primary object of the present invention to provide an improved method and system for saving and recovering disabled aircraft.

In accordance with a primary aspect of the present invention, an aircraft recovery system comprises an enlarged net for suspension just beneath the water surface for catching and holding an aircraft near the water surface for recovery.

In accordance with a method of the invention, a large net is suspended at the surface of a body of water, a disabled aircraft is landed in the water in the net and supported at the surface until recovery.

BRIEF DESCRIPTION OF THE DRAWING

The above and other objects and advantages of the present invention will become apparent from the following description when read in conjunction with the accompanying drawings wherein:

FIG. 6 is a view like FIG. 4 showing an alternate embodiment.

DETAILED DESCRIPTION OF A PREFERRED EMBODIMENT

The present invention basically comprises a system for catching disabled aircraft and enabling the recovery thereof with minimal damage. In particular, the present invention comprises a system for deploying in a body of water for enabling the ditching of a plane into the body of water, and catching the plane in the net system of the present invention for supporting it until recovery of the aircraft is feasible.

Figure 1:
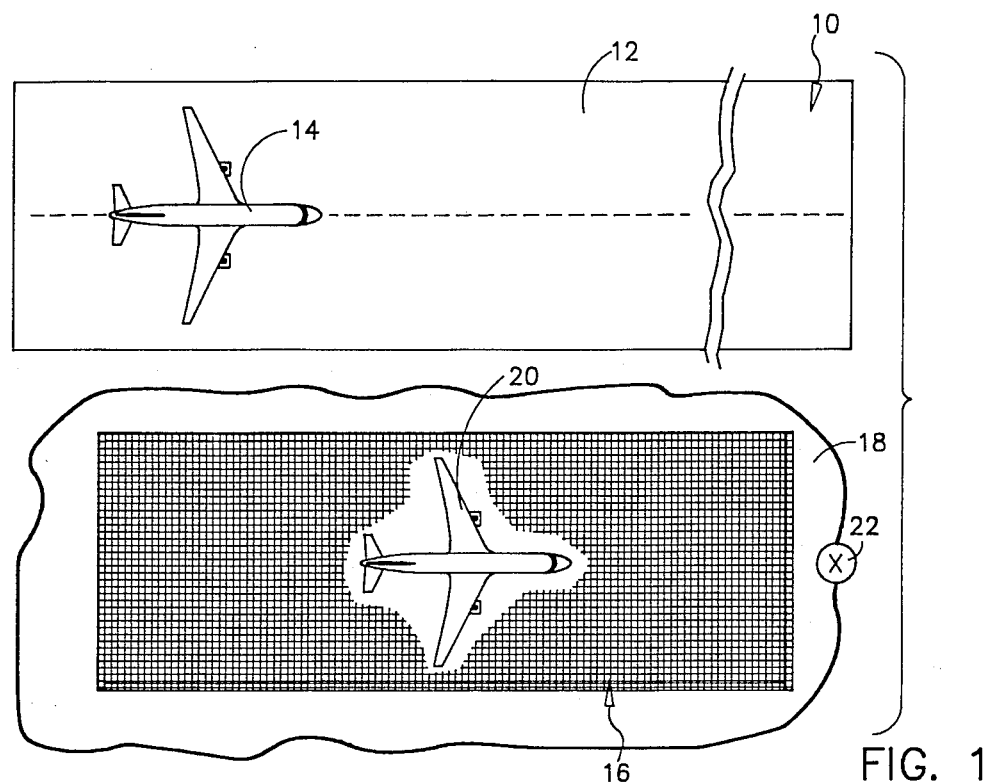
FIG. 1 is a top plan view of a preferred embodiment of the invention.

Referring particularly to FIG. 1 of the drawing, a system embodying the present invention is illustrated in conjunction with a land based airport and designated generally by the numeral 10. As illustrated in FIG. 1, a primary airport runway 12 is designed to accommodate aircraft, such as commercial airliners and the like 14. In accordance with the present invention, a system comprises a net 16 deployed and supported in a body of water 18 in the vicinity of the airport for catching and recovering disabled aircraft 20.

In accordance with FIG. 1, the body of water 18 may be any suitable body of water having sufficient length and width to accommodate the ditching of an aircraft. The body of water may be any suitable natural or man-made body of water in the vicinity of the airport having the required length, width and depth to accommodate the aircraft. The body of water may, for example, be a nearby river, lake, ocean, bay or a man-made lake or reservoir.

In areas where a natural body of water exists nearby, suitable facilities may be set up in the nearby body of water. Where such body of water does not exist, a man-made lake or trench may be formed in the vicinity of the airport in sufficient proximity that disabled aircraft, which are unable to land on the airport runway, may be crash landed into the body of water and caught on the net 16 and suspended at least partially submerged in the body of water until recovery is feasible.

A suitable aircraft electronic guidance and control system 22 is preferably appropriately positioned at the recovery site to enable the controlling of aircraft into the body of water.

Figure 2:
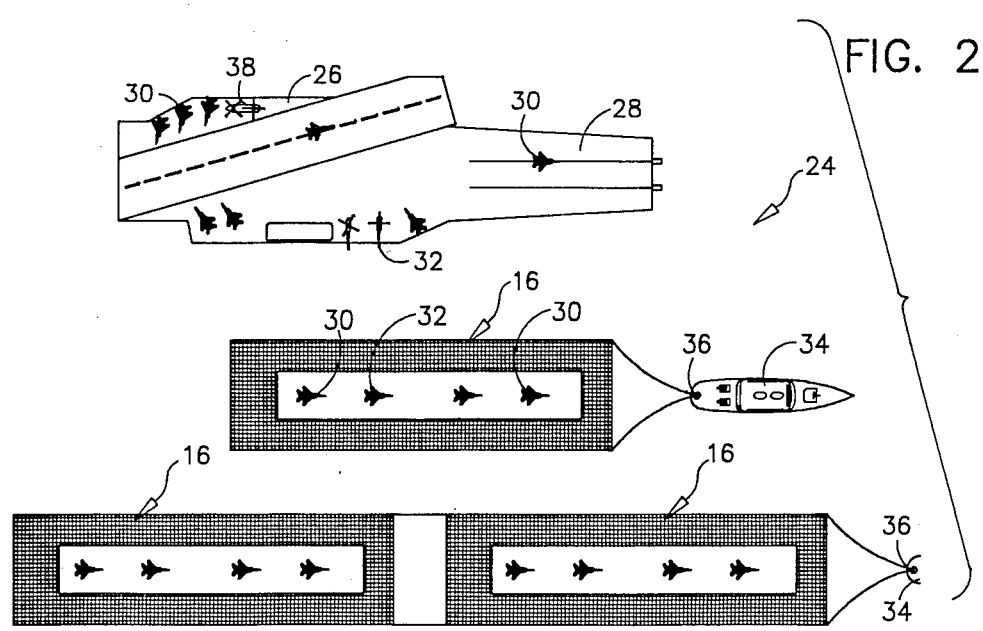
FIG. 2 is a side elevation view, in section, of the embodiment of FIG. 1.

Referring to FIG. 2 of the drawings, an example of a system arranged around an aircraft carrier and designed generally by the numeral 24 is illustrated. As shown in FIG. 2, an aircraft carrier 26 includes a landing and launch runway 28 and accommodates a number of aircraft, such as fighter planes 30 and helicopter 32.

Generally, in accordance with the system, disposed nearby the aircraft carrier is a system comprising a plurality of nets 16 that may be positioned in any suitable array and may, for example, be tended or towed by vessels 34 and 36. The catch nets may be positioned in any number of suitable arrangements, preferably in the vicinity of the aircraft carrier. This arrangement would enable continuous operation of an aircraft carrier and the aircraft carried thereby. The present arrangement would enable a greater flexibility in the deployment and recovery of aircraft of the fleet. For example, scheduled departure of aircraft need not be delayed in order to accommodate incoming aircraft that are short of fuel for example.

At present, it is not uncommon to ditch aircraft at sea because they cannot be brought back to the carrier because of low fuel, or because of the presence of aircraft being launched from the flight deck. With the present invention, aircraft that are not necessarily disabled but cannot be immediately accommodated on the flight deck of the aircraft may be ditched or crash landed at sea on the series of nets, in accordance with the invention, and held until complete recovery is feasible.

The system preferably includes aircraft control and guidance system 36, which may for example be mounted on the tending ships for guiding the aircraft onto the recovery nets. The nets may be simply deployed and left in place or they may be towed behind tending ships 34, as illustrated in FIG. 2. Numerous approaches to deployment of the nets can be taken. For example, the nets may be deployed from aircraft, surface ships or from submarines. The nets in their preferred form are sufficiently long that an aircraft can easily land on the water's surface at a shallow angle and have sufficient distance to decelerate under the force of the water and drop into the net. By way of example, a jet aircraft lands at about one-hundred fifty to two-hundred miles per hour and needs about three to five thousand feet of runway to land and decelerate. The drag of water on the aircraft could shorten the distance to about one-half that distance for an aircraft in the landing mode, i.e. a shallow angle with flaps and landing gear deployed. In most instances, it would not be desirable to extend the landing gear.

The aircraft would also require considerably less force to support it in the submerged condition than in the non-submerged condition. For example, an F-16, which reportedly weighs about forty-six thousand pounds, could be supported in water with much less force than in the air. With this arrangement, a plurality of aircraft as illustrated can be accommodated in each particular net. Particularly under the control of an electronic system if the guide slope and velocity of the plane were appropriately controlled, they could be dropped or landed into the nets in a sequence to place the first one at the forward end of the net and subsequent ones at further back in the net. It will also be appreciated that the nets can be towed until a first aircraft is deposited in the net, after which it is contemplated that the nets will remain relatively stationary due to the potential problems of moving the net and the aircraft through the water.

Figure 3:
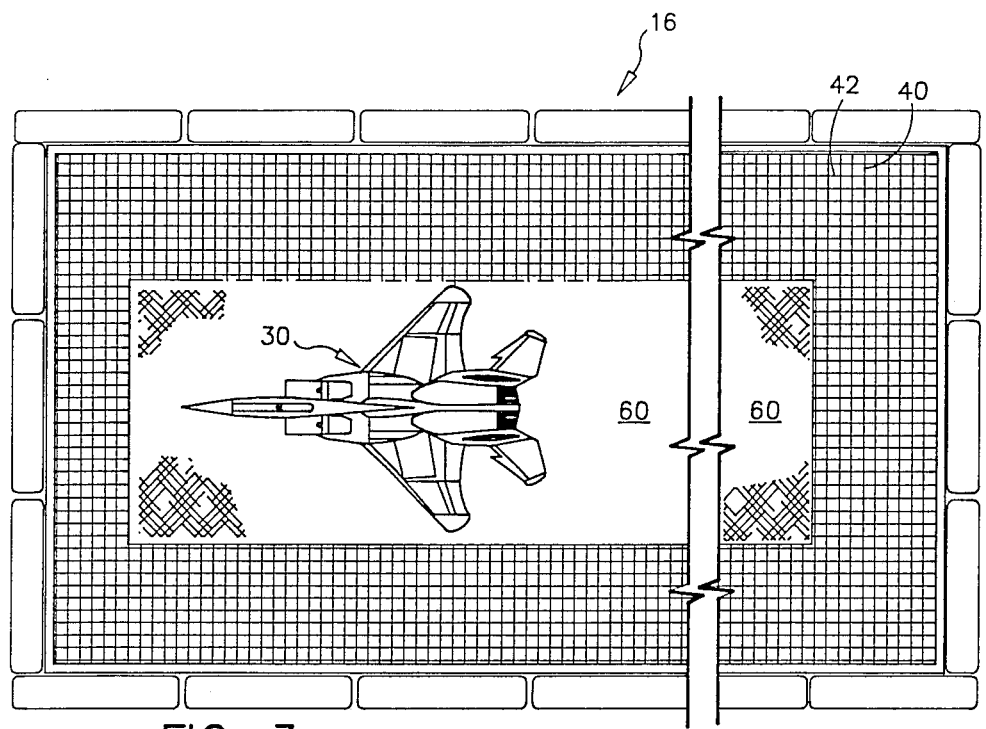
FIG. 3 is a front elevation view, in section, of the embodiment of FIG. 1 showing a different aircraft.

Referring now more particularly to FIG. 3, the net system 16 comprises an open mesh net having a generally rectangular configuration constructed of lateral and longitudinally extending high strength cables 40 and 42, which are constructed of a suitable material to withstand the saltwater environment and to support the weight of one or more aircraft in a partially submerged condition. The cables may be constructed of such materials as stainless steel, high strength plastics, including carbon filament nylon and the like. The net is woven with the openings between the lines sufficiently small to enable the wheels of the aircraft to pass over the net without falling through the opening. Thus, the opening will have a major dimension less than that of the diameter of the wheels of the aircraft. The cross lines are connected where they cross in a suitable fashion by clamps, welding or other suitable means known in the art.

Figure 5:
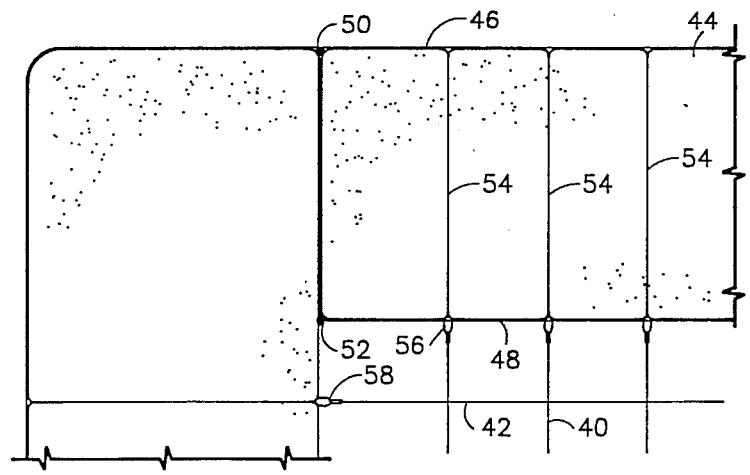
FIG. 5 is a section view taken on line V—V of FIG. 1.

The net is suspended within a rectangular frame formed of lightweight buoyant float members 44, each having a generally elongated rectangular configuration, as shown in more detail in FIGS. 5 and 6. The peripheral support framework for the net system comprises a plurality of the float members 44 connected in end to end arrangement for the sides and a side butting arrangement at the corners, as shown in FIG. 5 totally enclosing or surrounding the net. Suitable tie rigging is utilized to tie the floats together and the net to the floats in a suitable fashion. The tie rigging may consist of cables, straps, fabric or a combination of these.

The floats in the illustrated embodiment, as shown in FIG. 5, comprise large blocks of foam or other suitable low density material formed in beam like or rectangular beam like sections secured together by suitable rigging. In the illustrated embodiment, the rigging may, for example, consist of a plurality of tie straps 46 and 48 extending along opposite sides of each block and secured by suitable clamps or brackets 50 and 52 at the junctures of each block. Additional rigging may include suitable bands 54 extending around and secured around the blocks of buoyant material and secured to the cables 40 and 42 by means of suitable brackets 56 and 58. The float blocks are secured together to form a peripheral frame supporting the net, as shown in FIGS. 5 and 6. The net is supported in a manner such that it will support the aircraft 30 at least in a partially submerged configuration, as shown in FIG. 4.

Figure 4:
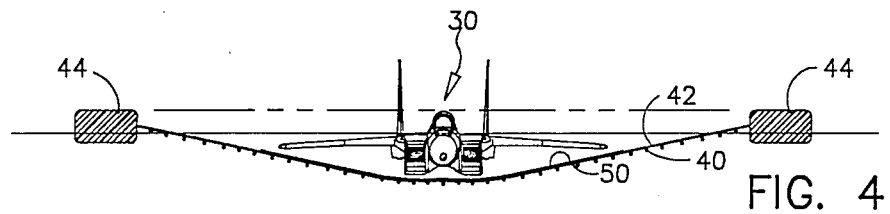
FIG. 4 is a section view taken on line IV—IV of FIG. 1.

As shown in FIGS. 3 and 4, an elongated rectangular blanket 60 is preferably placed on the surface of the net in the center thereof to support the aircraft 30. The blanket is preferably of a more closely woven or nap material than that of the net to aid in supporting the aircraft on the net. The aircraft may be removed from the nets by suitable means, such as large crane helicopters 38 or suitable cranes on the ships themselves.

Referring to FIGS. 7 and 8, and alternate buoyancy system is illustrated wherein the net is supported from a framework comprising a plurality of elongated tubular airbags 62 secured in end to end fashion as the floats of the previous embodiment and having additional vertically oriented air chambers 64 secured thereto. The net is supported from the members 62, such as by means of a plurality of brackets 66 extending around tubing members 68 spaced outward from the float members 62. The cables 40 and 42 of the net are then secured by suitable clamp means to the tubular members 68. The air chambers 64 may be detachably connected to the tubular beams or airbags by suitable fastening means, such as fabric sleeves 70. These airbag floats may be totally collapsible to enable a more compact folding of the net system for stowing and the like.

In operation, a land based airport is set up with a system in accordance with the invention by selecting or providing a body of water in close proximity to the airport that is sufficiently long and deep to accommodate the crash landing of an aircraft on a net system in accordance with the invention. A net system, in accordance with the invention, is prepared and placed in the water in a position to receive an aircraft in its landing mode. Thereafter, the system is available should it be necessary to land such an aircraft in the system due to any number of difficulties, such as collapsed landing gear, damaged or blocked runways with the aircraft being with insufficient fuel to divert to another air field and other such problems. In the preferred form, an aircraft control and landing system is available to automatically take control of the aircraft and guide it to a proper landing position within the body of water relative to the underlying support net system.

In a similar fashion, aircraft at sea may be received by the provision of net systems, either in and around aircraft carrier or other locations as necessary. For example, submarines at sea may have net systems aboard that can be deployed to receive transatlantic flights that are in trouble and unlikely to make it to land.

In the aircraft carrier situation, any number of the net systems may be available and deployed in any suitable manner. In a preferred manner, the systems may be deployed from tending ships and towed along with the aircraft carrier until planes are caught in the net, at which time the nets may be cut loose and left to support the aircraft until recovery ships can return and recover the aircraft.

Any number of situations in and around an aircraft carrier operation may warrant the use of a system in accordance with the invention. The system also gives the aircraft carrier fleet sufficient flexibility to enable the fleet to conduct more efficient operations without the necessity of precise scheduling of return aircraft.

While I have illustrated and described my invention by means of specific embodiments, it is to be understood that numerous changes and modifications may be made therein without departing from the spirit and scope of the invention as defined in the appended claims.

I claim:

1. An aircraft recovery system, comprising;
   an enlarged net having a generally rectangular configuration; and
   peripheral support means extending around and totally enclosing said net for supporting said net in a stationary position near the surface of a body of water for enabling an aircraft to land on water above said net and for receiving and supporting said aircraft in a partially submerged position at the surface of said body of water indefinitely, said peripheral support means comprises a plurality of floats secured around the perimeter of the net.

2. A recovery system according to claim 1 wherein:
   said net has a width at least that of the aircraft and a length at least a multiple of the length of the aircraft.

3. A recovery system according to claim 1 further comprising:
   blanket means having sufficient width for receiving the wheels of an aircraft disposed on said net.

4. A recovery system according to claim 1 wherein:
   said net has a length sufficient to accommodate an aircraft in a water landing mode.

5. A recovery system according to claim 2 further comprising:
   blanket means having sufficient width for receiving the wheels of an aircraft disposed on said net.

6. A recovery system according to claim 5 wherein:
   said net has a length sufficient to accommodate an aircraft in a landing mode.

7. A recovery system according to claim 6 wherein:
   said means for supporting said net comprises a plurality of air chamber floats secured around the perimeter of the net.

8. An aircraft recovery system for recovering an aircraft, said system comprising in combination:
   an enlarged body of water having a width exceeding that of the aircraft, a length at least a multiple of the length of the aircaft, and a depth to accommodate at least partial submergence of an aircraft;
   a net having width at least equal to the width of the aircraft and a length at least a multiple of the length of the aircraft; and
   float means totally enclosing said net for supporting said net in a stationary position near the surface of said body for enabling an aircraft to land on the water above said net and for receiving and supporting said aircraft in at least the partially submerged position.

9. A recovery system according to claim 8 wherein:
   said body of water has a length that is sufficient to accommodate the aircraft in a water landing mode.

10. A recovery system according to claim 9 wherein:
    said means for supporting said net comprises a plurality of floats secured completely around the perimeter of the net.

11. A recovery system according to claim 10 further comprising:
    blanket means having sufficient width for receiving the wheels of an aircraft disposed on said net.

12. A recovery system according to claim 11 wherein:
    said net has a length sufficient to accommodate an aircraft in a water landing mode.

13. A recovery system according to claim 12 wherein:
    the length of said net is at least one-half mile in length.

14. A recovery system according to claim 13 wherein:
    said floats are elongated blocks of foam secured together in an abutting arrangement.

15. A method for the recovery of disabled aircraft, comprising the steps of:
    selecting a body of water having sufficient surface area to surround the aircraft and sufficient depth to accommodate the aircraft in at least a partially submerged condition;
    selecting and placing a large net means sufficient to encompass the aircraft in the body of water;
    supporting the net in a stationary position near the surface of said body of water with supporting means totally enclosing the net;
    landing an aircraft on the water above said net; and
    receiving and supporting the aircraft in said net in at least a partially submerged condition.

16. A method according to claim 15 wherein:
    the step of selecting a body of water comprises selecting a natural body of water selected from the group consisting of oceans, seas, rivers and lakes.

17. A method according to claim 15 wherein:
    the step of selecting a body of water comprises the step of creating a man-made lake in the vicinity of an airport.

18. A method according to claim 15 wherein:
    the step of selecting the net comprises selecting a net having a length sufficient to accommodate the aircraft in the landing mode in water.

19. A method according to claim 18 further comprising:
    selecting and mounting a blanket over the net for accommodating the wheels of an aircraft.

* * * * *